Nov. 23, 1965 W. C. BATES ETAL 3,219,754

MODULATION CIRCUIT INCLUDING AN ELECTRON BEAM DEFLECTION AMPLIFYING DEVICE

Filed June 25, 1962 2 Sheets-Sheet 1

INVENTORS:
WILLIAM C. BATES,
THOMAS T. TRUE,
BY Joseph Levinson
THEIR ATTORNEY.

INVENTORS:
WILLIAM C. BATES,
THOMAS T. TRUE,
BY Joseph Levinson
THEIR ATTORNEY.

3,219,754
Patented Nov. 23, 1965

3,219,754

MODULATION CIRCUIT INCLUDING AN ELECTRON BEAM DEFLECTION AMPLIFYING DEVICE

William C. Bates, Clay, and Thomas T. True, Camillus, N.Y., assignors to General Electric Company, a corporation of New York Filed June 25, 1962, Ser. No. 204,983
2 Claims. (Cl. 178—5.4)

Figure 1:
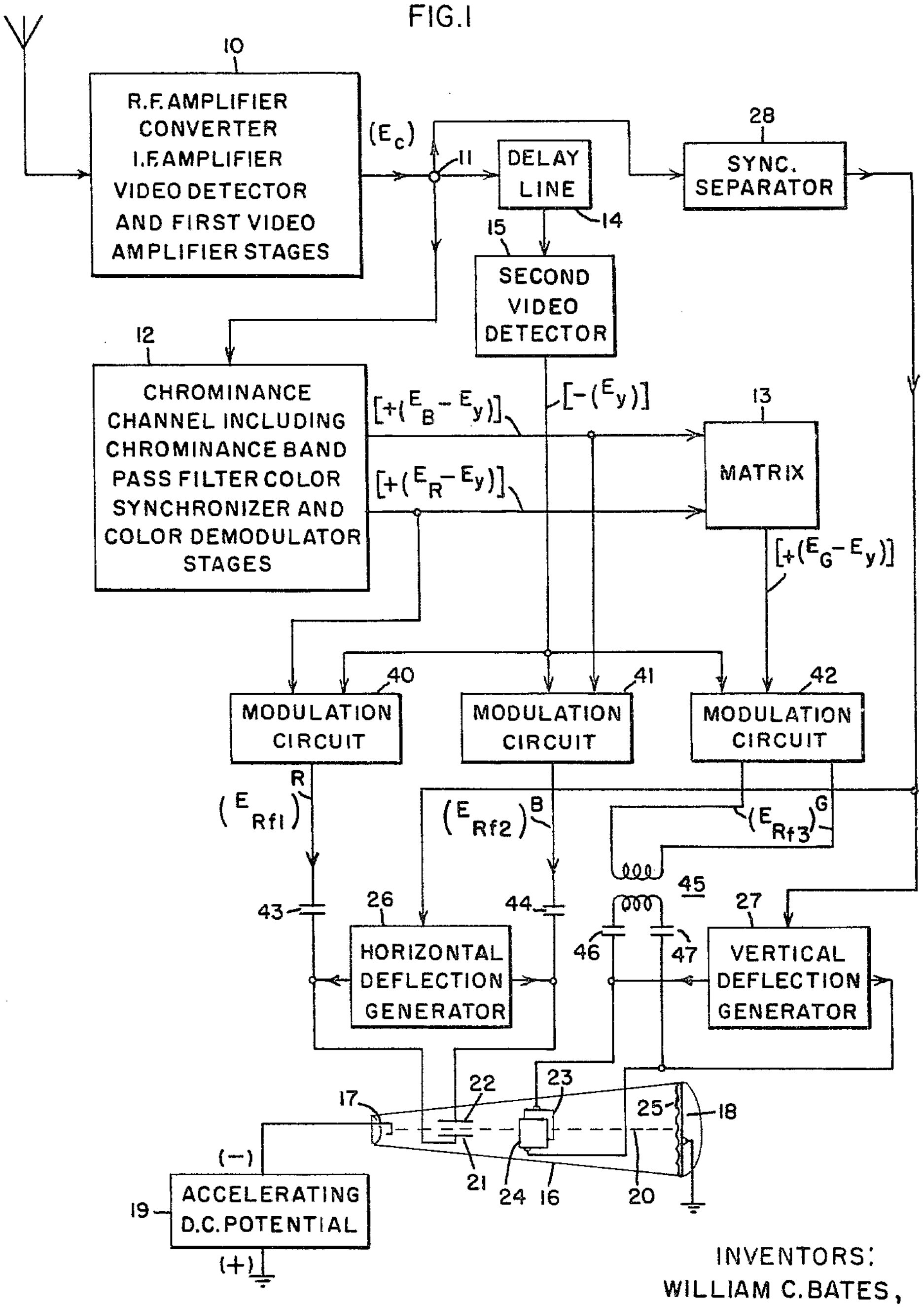

This invention relates to amplitude modulation circuits and more particularly to an amplitude modulation circuit which is arranged for simultaneously performing a plurality of circuit functions.

Light valve color projection systems of the type described in Patent No. 2,813,146, which is assigned to the assignee of the present invention, require circuit means providing electrical modulating voltages for modulating the velocity of a scanning electron beam in accordance with primary color information derived from color input voltages. In one circuit arrangement for generating the required modulating voltages, there is provided means for generating three sinusoidal radio frequency voltages for differing frequencies and means for amplitude modulating each of the radio frequency voltages with an associated one of the three primary color input voltages, ($E_R$), ($E_B$), or ($E_G$). These modulated radio frequency voltages are coupled to electron beam deflection plates in a light valve projection apparatus in the system and modulate the horizontal and vertical velocities of a scanning electron beam generated within the apparatus.

When the light valve projection system is utilized to project broadcast television images in color, the referred-to primary color input voltages are derived from a presently approved NTSC broadcast color signal. As is well known, the primary color voltages ($E_R$), ($E_B$) and ($E_G$) are formulated at a receiving station from the NTSC color signal by combining a detected luminance component voltage ($E_Y$) and color difference component voltages ($E_R-E_Y$), ($E_B-E_Y$) and ($E_G-E_Y$).

Presently employed circuit arrangements for providing the three described functions of generating a radio frequency voltage, combining the color difference and luminance voltages of the NTSC color signal to provide a resultant primary color voltage and amplitude modulating the radio frequency voltage in accordance with the resultant color voltage is relatively complex and costly.

Accordingly, it is an object of this invention to provide in a light valve color projection system an improved circuit arrangement for generating an electron beam velocity modulating voltage.

Another object of this invention is to provide an improved circuit arrangement for generating a radio frequency voltage having amplitude variations which correspond to intelligence derived from the algebraic combination of the amplitudes of first and second input voltages.

Another object of this invention is to provide an improved circuit arrangement which performs the three functions of generating a radio frequency voltage, algebraically combining the amplitudes of two input voltages and amplitude modulating the radio frequency voltage in accordance with the resultant algebraic combination of the input voltages.

Another object of this invention is to provide an improved circuit arrangement utilizing a single amplifying device for performing the aforementioned three desired functions.

Still another object of this invention is to provide an improved circuit arrangement utilizing a single electron beam-deflection amplifying device which generates a radio frequency alternating voltage and both algebraically combines two input voltages and amplitude modulates the radio frequency voltage in accordance with the algebraic combination of the two input voltages.

A further object of this invention is to provide a circuit arrangement including an electron beam-deflection amplifying device having first and second deflection electrodes and first and second input voltages coupled respectively to the first and second deflection electrodes for both algebraically combining the input voltages to provide a resultant electric field between the electrodes and deflecting an electron beam generated within the device in accordance with the resultant electric field.

In accordance with the present invention, an amplitude modulation circuit is provided having a beam deflection electron discharge amplifying device including a cathode electrode, a control electrode, an accelerating electrode, first and second anode electrodes and first and second beam deflection electrodes. A load circuit for the device is coupled between the cathode and the first anode electrode. Positive feedback means are provided and coupled between cathode, control and accelerating electrodes for causing self-sustained intensity modulation, at a desired frequency, of an electron beam generated within the device. First and second input modulating voltages are coupled to the first and second beam deflection electrodes respectively for deflecting the beam between the anode electrodes in accordance with an algebraic combination of the amplitudes of the input voltages and causing an amplitude modulated radio frequency voltage to exist in the load circuit.

Figure 2:
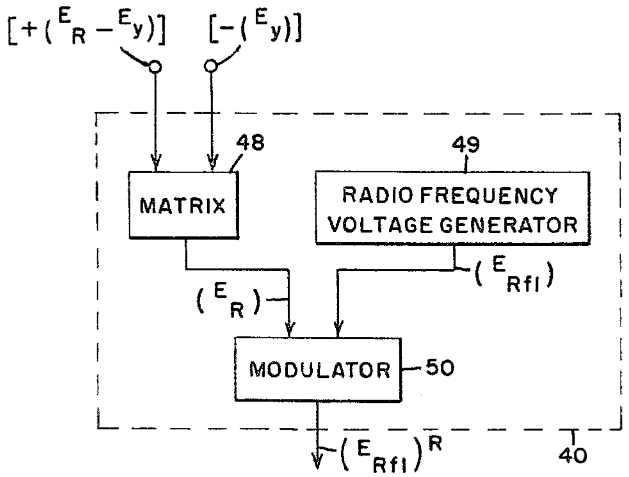
Figure 3:
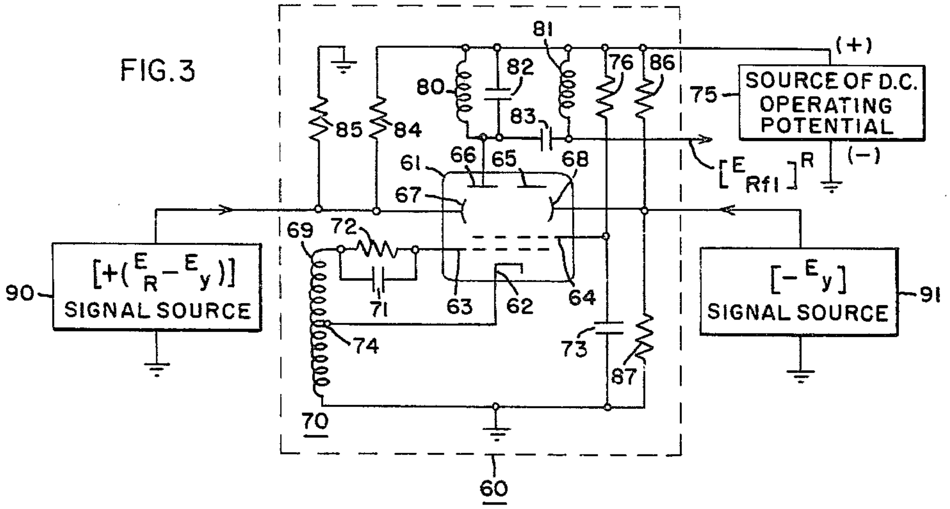

Further objects, features and the attending advantages of the invention will be apparent with reference to the following specification and drawings in which:

FIGURE 1 is a diagram, partly in block form, illustrating an electrical position of a light valve color projection system in which an embodiment of the present invention may be advantageously utilized, FIGURE 2 is a block diagram illustrating the function performed by a modulation circuit of the system of FIGURE 1, and FIGURE 3 is a diagram of one embodiment of the present invention.

In order that the attending advantages of the present invention may be fully appreciated, a brief description of the electrical portion of a light valve projection system for displaying television images in color and requiring a modulation circuit of the type referred to will be given with reference to FIGURE 1. The system of FIGURE 1 includes the necessary conventional television receiver circuit components for receiving and processing a presently approved NTSC color television signal in order to provide a luminance component voltage ($E_Y$), and red, blue and green color difference component voltages ($E_R-E_Y$), ($E_B-E_Y$) and ($E_G-E_Y$). To this end, a radio frequency amplifier, converter, intermediate frequency amplifier, video detector, and video amplifier stage, indicated generally by a block 10, are furnished for receiving a broadcast NTSC color television signal and providing a composite detected output voltage ($E_C$) at a junction point 11. The composite voltage ($E_C$) includes a luminance component ($E_Y$), chrominance components, and deflection circuit synchronizing components. Composite voltage ($E_C$) is coupled to and processed by a chrominance channel 12 which includes the necessary conventional color detection components including a chrominance band-pass filter, color synchronizer, and color demodulation stages for deriving red and blue color difference output voltages ($E_R-E_Y$) and ($E_B-E_Y$) from the input voltage. In a known manner, a matrix circuit 13, which may comprise a conventional resistive adder network and inverter circuit for summing the two input color difference voltages ($E_B-E_Y$) and ($E_R-E_Y$) in the proper ratios and inverting a resulting sum voltage provides an output color difference voltage $(E_G-E_Y)$. Composite voltage $(E_C)$ is also coupled from the junction point 11 to a conventional luminance channel which includes a delay line stage 14 and a video amplifier 15. The negative sign of the luminance component $[-(E_Y)]$ appearing at the output of amplifier 15 indicates a "synch positive" or "white negative" voltage which is inverted with respect to a standard "synch negative" luminance signal. Similarly, the positive sign of the separated color difference voltages at the output of the chrominance channel 12 and the matrix 13 indicates no inversion with respect to standard color difference signals. The color difference and luminance voltages are coupled to associated modulation circuits, described hereinafter, for further processing.

Also included in the projection system of FIGURE 1 is a light valve projection apparatus 16 having a cathode electrode 17, a target electrode 18 and a source of relatively very high direct current potential 19 for accelerating an electron stream, indicated by the dotted line 20, from the cathode 17 to the target electrode 18. A pair of horizontal electrostatic deflection plates 21 and 22 and a pair of vertical deflection plates 23 and 24 are provided for deflecting the beam 20 in a desired scanning raster upon a deformable medium 25 which is positioned relative to the target 18. For a more detailed description of the construction and operation of the projection apparatus 16 in a light valve projection system, reference is made to the light valve projection system of the aforementioned patent.

As previously indicated, the electron beam 20 is deflected in a scanning raster upon the medium 25. For this purpose, a horizontal sawtooth voltage generator 26 is provided and a balanced horizontal sawtooth beam deflection voltage at television line frequencies, which is generated thereby, is coupled to the horizontal deflection electrodes 21, 22 of apparatus 16. Similarly, a vertical sawtooth voltage generator 27 is furnished and a balanced sawtooth vertical beam deflection voltage at television field frequencies, which is generated thereby, is coupled to the vertical deflection electrodes 23, 24. Synchronizing signal components for synchronizing the frequency and phase of the generators 26 and 27 are separated from the composite signal $(E_C)$ by a separator stage 28 in a conventional manner and coupled to the horizontal and vertical generators.

Means comprising modulation circuits 40, 41 and 42 generate amplitude modulated radio frequency alternating voltages for velocity modulating the scanning electron beam 20 of apparatus 16. The modulation circuits 40 and 41 generate radio frequency alternating voltages $(E_{Rf1})$ and $(E_{Rf2})$ respectively which are amplitude modulated by respective red and blue primary color voltages $(E_R)$ and $(E_B)$. The modulated output voltages, indicated as $(E_{Rf1})^R$ and $(E_{Rf2})^B$, are coupled by capacitors 43 and 44 to the horizontal deflector plates 21 and 22 for modulating the horizontal velocity of a scanning electron beam. Similarly, the modulation circuit 42 generates an alternating voltage $(E_{Rf3})$ which, as described hereinafter, is negative amplitude modulated by a green primary color voltage $(E_G)$. The output voltage $(E_{Rf2})^G$ is coupled to the vertical deflection plates 23 and 24 via a balanced output circuit including a transformer 45 and coupling capacitors 46 and 47 for modulating the vertical scanning velocity of the electron beam.

The block diagram of FIGURE 2 indicates the circuit functions provided for generating the desired modulated output voltage $(E_{Rf1})^R$ from input voltages comprising the color difference voltage $[+(E_R-E_Y)]$ and the luminance voltage $[-(E_Y)]$. Circuit 40 includes a matrix stage 48 for combining the input color difference and luminance voltages to provide an output primary color voltage $(E_R)$. Also provided are a conventional radio frequency voltage generator stage 49 for generating a radio frequency voltage $(E_{Rf1})$ and a conventional modulator stage 50 for amplitude modulating the generated radio frequency voltage to provide an amplitude modulated output voltage $(E_{Rf1})^R$. For the purpose of this specification the term "combination" is understood to mean an algebraic addition or subtraction, in a desired ratio, of the instantaneous amplitudes of two voltages to produce a resultant instantaneous voltage or electric field. A desired resultant output voltage from the matrix 48 is $(E_R)$ and the matrix 48 should thus provide a subtractive combination of the input voltages $[+(E_R-E_Y)]$ and $[-(E_Y)]$, that is $[+(E_R-E_Y)]-[-(E_Y)]=+E_R$. This may be accomplished in a conventional manner by coupling these input voltages to adjacent electrodes of an electron discharge amplifying device and deriving the resultant amplified voltage $(E_R)$ from the anode electrode circuit.

The modulation circuit 40 of FIGURE 2 has been described with relation to the primary color voltage $(E_R)$. The functional stages for the two additional modulation circuits 41 and 42 required for the blue and green primary color voltages in the system differ from the circuit 40 only in the frequency of oscillation of their respective oscillator sections 49 and in the direction of modulation and the use of the balanced transformer output coupling for the green modulation circuit.

The above described arrangement of a matrix circuit 48, radio frequency oscillator 49, and modulator 50 for providing the desired functions for each of the modulation circuits is relatively costly and complex. In accordance with a feature of the present invention, a relatively less complex and costly circuit is provided which performs the functions provided by either of the modulation circuits 40, 41 or 42 of FIGURE 2. For a description of the arrangement and operation of one embodiment of this invention, reference is now made to FIGURE 3 wherein a modulation circuit is shown enclosed within a dashed line rectangle and indicated generally by 60. A single electron beam discharge amplifying device 61 of the sheet beam deflection type is included in the modulation circuit 60. The sheet beam deflection device 61 includes a cathode electrode 62, a control electrode 63, an accelerating electrode 64, anode electrodes 65 and 66, and deflection electrodes 67 and 68. The sheet beam deflection device 61 is well known in the art and is exemplified by the presently commercially designated types 6AR8, 6JH8 and 7360.

In accordance with one feature of the present invention, positive feedback circuit means are coupled between control and accelerating electrodes 63 and 64 for causing the section of device 61 represented by electrodes 62, 63 and 64 to operate as a radio frequency oscillator. The oscillator section is arranged as a conventional Hartley oscillator and includes a feedback network having one end of a winding 69 of a tapped inductance, indicated generally by 70, connected to the control electrode 63 via an RC grid leak bias arrangement comprised of a capacitor 71 and a resistor 72. Another end of the winding 69 of the inductance 70 is grounded and is connected to the accelerating electrode 64 for alternating currents via a capacitor 73 which provides a low impedance at the frequency of oscillation. The cathode 62 of device 61 is connected to a tap 74 of the winding 69 and to ground potential for direct currents by a section of the winding. A source of operating potential 75 for the device 61 is provided and is connected for providing an operating voltage for the accelerating electrode 64 via a voltage dropping resistor 76. The inductance 70 is selected for providing in conjunction with stray winding capacitance, not indicated, parallel resonance at a desired frequency of operation, $f_1$. When necessary, additional fixed capacitance may be connected across the inductance 70 for providing a desired resonant frequency. A load circuit comprising a $\pi$ type filter circuit including a pair of inductances 80 and 81 and a pair of capacitors 82 and 83 is connected to anode 66. The filter circuit is arranged for providing a desired flat topped wide bandwidth frequency response characteristic. Operating potential for the anode 66 is provided by the source 75 via the inductance 80. An electron beam is generated in the device 61 and is intensity modulated by the previously described oscillator section. A radio frequency voltage is consequently developed across the filter circuit and coupled to a utility circuit, which may be the deflection plates of the apparatus 16 of FIGURE 1. It is desirable in some instances to maintain the deflection electrodes at a fixed positive potential and for this purpose voltage dividers comprising resistors 84, 85, and 86, 87 are furnished and are connected between the source of potential 75, ground potential and the respective deflection electrodes.

In accordance with another feature of this invention, the instantaneous amplitudes of first and second input voltages are combined and the above described generated radio frequency voltage is amplitude modulated in accordance with this combination of the input voltages. A first source of signal voltage 90 is coupled to the deflection electrode 67 and a second source of signal voltage 91 is similarly coupled to the deflector electrode 68. A resultant instantaneous electric field exists between the deflector electrodes 67 and 68 which is the algebraic difference between independent electric fields established therebetween by the voltage sources 90 and 91 above. The resultant field between electrodes 67 and 68 therefore is a subtractive combination of the input voltages 90 and 91 and represents red primary color intelligence, for example, when the input voltages are $[+(E_R-E_Y)]$ and $[-(E_Y)]$. The sheet beam of electrons is deflected between the anode electrodes 65 and 66 in accordance with the intensity of the resultant electric field existing between the deflector electrodes 67 and 68. Thus, the deflection of the beam between the anodes in accordance with this resultant field causes an amplitude modulated radio frequency voltage to exist across the filter load circuit. Hence, the circuit 60 equivalently performs the three functions performed by the modulation circuit 40 of FIGURE 2.

When desired, a load circuit may be coupled between the anode electrode 65 and the cathode electrode 62. With this arrangement, the radio frequency voltage appearing in the load circuit of anode 65 will be "negative modulated" with respect to a modulated radio frequency voltage appearing in the load circuit coupled to anode 66. That is, the primary color modulation components of the radio frequency voltages in the respective load circuits would be 180° out of phase with each other. As previously indicated, "negative modulation" is required for the modulation circuit 42 of FIGURE 1. Furthermore, it will be obvious to those skilled in the art that if the voltage sources 90 and 91 of FIGURE 3 provide $[-(E_R-E_Y)]$ and $(+E_Y)$ respectively rather than $[+(E_R-E_Y)]$ and $(-E_Y)$ as shown, then a positively modulated radio frequency voltage will occur in a load circuit connected to anode 65 while a negatively modulated radio frequency voltage will occur in a load circuit connected to anode 66.

As previously indicated, when the modulation circuit 60 of FIGURE 3 is utilized in conjunction with the system of FIGURE 1, three such circuits are provided for replacing modulation circuits of the type described in FIGURE 2. The frequency of oscillation of each modulation circuit is adjusted to a desired frequency.

Although the present invention has been described with relation to a light valve color projection system, the invention is equally applicable in the arrangements requiring the functions provided by the invention.

While I have illustrated and described and have pointed out in the annexed claims certain novel features of my invention, it will be understood that various omissions, substitutions and changes in the forms and details of the system illustrated may be made by those versed in the art without departing from the spirit of the invention and scope of the claims.

What we claim as new and desire to secure by Letters Patent of the United States is:

1. A light valve projection system including means for receiving a broadcast color television signal and providing output color difference and luminance voltages therefrom; a light valve projection apparatus having a pair of electron beam deflection plates; a modulation circuit for providing a radio frequency output voltage which is amplitude modulated by primary color intelligence; said modulation circuit including an electron beam amplifying device having a cathode electrode, a control electrode, an accelerating electrode, first and second deflection electrodes, and an anode electrode; positive feedback means coupled between said control and accelerating electrodes for causing alternating intensity modulation of an electron beam generated by said device; a source of positive potential, a load circuit for said device coupled between said anode electrode and said source; means coupling said color difference voltage from said receiving means to said first deflection electrode; means coupling said luminance voltage from said receiving means to said second deflection electrode; and means coupling an amplitude modulated alternating output voltage from said anode electrode to one of said deflection plates in said projection apparatus.

2. A modulation circuit for deriving a sinusoidal wave of a desired frequency that is amplitude modulated in accordance with the algebraic difference between a color difference signal and a luminance signal comprising a beam deflection electron discharge amplifying device having a cathode, a control electrode, an accelerating electrode, first and second anodes and first and second beam deflection electrodes, a source of operating potential having first and second terminals, a load impedance connected between said first anode and said first terminal, a connection between said second anode and said first terminal, and a connection between said second terminal and said cathode, circuit means coupled between said cathode, control electrode and accelerating electrode so as to produce oscillations at the desired frequency, thereby modulating the intensity of the beam of electrons proceeding toward said anodes and between said beam deflection electrodes, a source of color difference signals, a source of a luminance signal, means applying a voltage corresponding to said color difference signal to said first beam deflection electrode, and means applying a voltage corresponding to said luminance signal to said second deflection electrode, whereby said beam is deflected in accordance with the amplitude of the color component of said color difference signal so that a greater or less portion of the beam strikes said first anode, and the remaining portion strikes said second anode, thereby producing a voltage across said load impedance that is a sinusoidal wave of the desired frequency and which is amplitude modulated in accordance with the algebraic difference between the color difference signal and the luminance signal.

References Cited by the Examiner

UNITED STATES PATENTS 2,262,407 11/1941 Rath ---------------- 329—113
2,988,703 6/1961 Sensenig ------------ 328—229

OTHER REFERENCES

Vance: QST for March 1960, page 34 cited.

DAVID G. REDINBAUGH, *Primary Examiner*.

ROBERT SEGAL, *Examiner*.